(12) United States Patent
Kujira et al.

(10) Patent No.: US 6,246,205 B1
(45) Date of Patent: Jun. 12, 2001

(54) DRIVING APPARATUS FOR STEPPING MOTOR

(75) Inventors: Yukinobu Kujira, Toyohashi; Seiji Tateishi, Kosai, both of (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/328,517

(22) Filed: Jun. 9, 1999

(30) Foreign Application Priority Data

Oct. 6, 1998 (JP) .................................................. 10-162014
Dec. 5, 1998 (JP) .................................................. 11-130783

(51) Int. Cl.$^7$ ............................................. H02K 29/04
(52) U.S. Cl. ..................... 318/685; 318/696; 318/687; 318/254
(58) Field of Search ................................. 318/560–696, 318/700; 310/268

(56) References Cited

U.S. PATENT DOCUMENTS

| | | | | |
|---|---|---|---|---|
| 4,371,821 | * | 2/1983 | Laesser et al. ........................ | 318/696 |
| 4,446,406 | * | 5/1984 | Uzuka ................................... | 318/254 |
| 4,558,268 | * | 12/1985 | Besson et al. ........................ | 318/696 |
| 4,628,231 | * | 12/1986 | Radziwill et al. .................... | 318/138 |
| 4,663,577 | * | 5/1987 | Satomi ................................. | 318/696 |
| 4,677,358 | * | 6/1987 | Sugawara et al. .................... | 318/696 |
| 4,739,239 | * | 4/1988 | Krause et al. ........................ | 318/685 |
| 4,755,732 | * | 7/1988 | Ando .................................... | 318/696 |
| 4,799,002 | * | 1/1989 | Matsumoto .......................... | 318/696 |
| 4,956,595 | * | 9/1990 | Hirofumi et al. ..................... | 318/696 |
| 5,059,883 | * | 10/1991 | Takahashi ............................ | 318/696 |
| 5,850,133 | * | 12/1998 | Heglund ............................... | 318/700 |
| 5,925,965 | * | 7/1999 | Li et al. ................................ | 310/268 |

FOREIGN PATENT DOCUMENTS 05155222 6/1993 (JP) .
10146098 5/1998 (JP) .

* cited by examiner

*Primary Examiner*—Paul Ip
(74) *Attorney, Agent, or Firm*—Nawrocki, Rooney & Sivertson, P.A.

(57) ABSTRACT

A driving apparatus of a stepping motor has a simplified circuit structure and a bipolar driving system. The stepping motor has two exciting coils, which are driven by respective bridge circuits. Transistors provided respectively on two sides of one of the bridge circuits are commonly used by both of the bridge circuits. Accordingly, the driving circuit is formed with a reduced number of transistors.

18 Claims, 12 Drawing Sheets

Fig. 1A
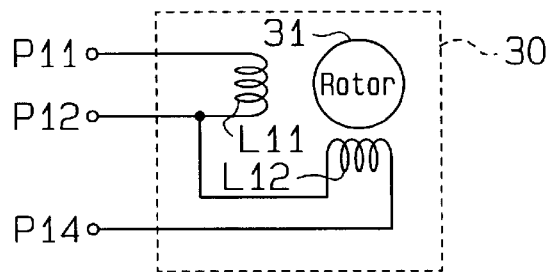
Fig. 1B
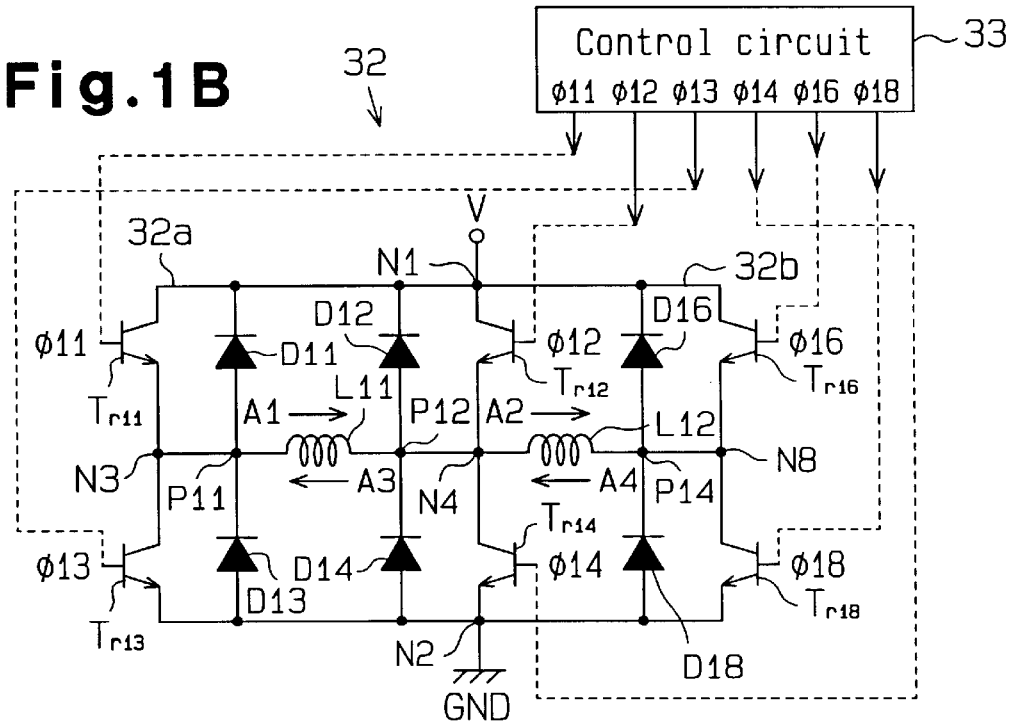
Fig. 2
| Step | Driving circuit | | | | | |
|---|---|---|---|---|---|---|
| | $T_{r11}$ | $T_{r12}$ | $T_{r13}$ | $T_{r14}$ | $T_{r16}$ | $T_{r18}$ |
| 1 | ON | | | ON | | |
| 2 | | ON | | | | ON |
| 3 | | ON | ON | | | |
| 4 | | | | ON | ON | |
Blank boxes mean "OFF"

Fig.12 (Prior Art)

| Step | First driving portion | | | | Second driving portion | | | |
|---|---|---|---|---|---|---|---|---|
| | $T_{r11}$ | $T_{r12}$ | $T_{r13}$ | $T_{r14}$ | $T_{r15}$ | $T_{r16}$ | $T_{r17}$ | $T_{r18}$ |
| 1 | ON | | | ON | | | | |
| 2 | | | | | ON | | | ON |
| 3 | | ON | ON | | | | | |
| 4 | | | | | | ON | ON | |

Blank boxes mean "OFF"

DRIVING APPARATUS FOR STEPPING MOTOR

BACKGROUND OF THE INVENTION

1. Field of the Invention

The present invention relates to a driving apparatus for a stepping motor.

2. Prior Art

Some vehicle air conditioners use a PM (permanent Magnet) type stepping motor in an actuator driving a door for switching blowing-out ports in a duct, or the like. To drive the stepping motor, a unipolar driving system (a first prior art) and a bipolar driving system (a second prior art) have been used.

(The First Prior Art)

As shown in FIGS. 10A and 10B, a stepping motor 10 of a unipolar driving system has a rotor 11 and first to fourth exciting coils L1–L4 which apply a rotating magnetic field to the rotor 11. The respective ends of the first to the fourth exciting coils L1–L4 are connected to the plus terminal of a power supply V via an external terminal P0 of the motor 10. The respective other ends of the first to the fourth exciting coils L1–L4 are connected to a driving circuit 12 via external terminals P1–P4, respectively.

The driving circuit 12 includes four npn-type bipolar transistors Tr1–Tr4 and four flywheel diodes D1–D4. Each of the diodes D1–D4 is connected between a collector and an emitter of one of the transistors Tr1–Tr4. The collectors of the transistors Tr1–Tr4 are connected to the other ends of the first to the fourth exciting coils L1–L4 via the external terminals P1–P4, respectively, and the emitters thereof are connected to the ground GND.

Control signals Ø1–Ø4 from a control circuit 13 are input to the bases of the transistors Tr1–Tr4, respectively, and the transistors Tr1–Tr4 are selectively turned on and off by the control signals Ø1–Ø4.

Thus, in the driving circuit 12 of the stepping motor 10, the transistors Tr1–Tr4 are sequentially turned on and off on the basis of the control signals Ø1–Ø4 from the control circuit 13 and the first to the fourth exciting coils L1–L4 are sequentially excited. The sequential excitations of the first to the fourth exciting coils L1–L4 causes the rotating magnetic field to be generated and the rotor 11 to be rotated.

(The Second Prior Art)

As shown in FIGS. 11A and 11B, a stepping motor 20 of a bipolar driving system has a rotor 21 and first and second exciting coils L11 and L12 that apply a rotating magnetic field to the rotor 21. Both ends of the first exciting coil L11 are connected via external terminals P11 and P12, respectively, to a first driving portion 22a of a driving circuit 22. Both ends of the second exciting coil L12 are connected via external terminals P13 and P14, respectively, to a second driving portion 22b of the driving circuit 22.

The first driving portion 22a includes a bridge circuit 23a including four npn-type bipolar transistors Tr11–Tr14, and four flywheel diodes D11–D14 each connected between a collector and an emitter of each of the transistors Tr11–Tr14. A power supply V is supplied between nodes N1 and N2, where the node N1 is located between the collectors of the transistors Tr11 and Tr12, and the node N2 is located between the emitters of the transistors Tr13 and Tr14. A node N3, between the emitter of the transistor Tr11 and the collector of the transistor Tr13, is connected via the external terminal P11 to the one end of the first exciting coil L11. A node N4 existing between the emitter of the transistor Tr12 and the collector of the transistor Tr14 is connected via the external terminal P12 to the other end of the first exciting coil L11.

The second driving portion 22b includes a bridge circuit 23b including four npn-type bipolar transistors Tr15–Tr18, and four flywheel diodes D15–D18 each connected between a collector and an emitter of each of the transistors Tr15–Tr18. The power supply V is supplied between nodes N5 and N6, where the node N5 is located between the collectors of the transistors Tr15 and Tr16, and the node N6 is located between the emitters of the transistors Tr17 and Tr18. A node N7 existing between the emitter of the transistor Tr15 and the collector of the transistor Tr17 is connected via the external terminal P13 to the one end of the second exciting coil L12. A node N8 existing between the emitter of the transistor Tr16 and the collector of the transistor Tr18 is connected via the external terminal P14 to the other end of the second exciting coil L12.

Control signals Ø11–Ø18 from a control circuit 24 are input to the bases of the transistors Tr11–Tr18, respectively, and the transistors Tr11–Tr18 are selectively turned on and off on the basis of the control signals Ø11–Ø18.

More specifically, as shown in FIG. 12, the control circuit 24 first turns on only the transistors Tr11 and Tr14 (Step 1). This causes an exciting current to flow through the first exciting coil L11 in the direction of an arrow A1 and a magnetic field is generated on the basis of the exciting current. Next, the control circuit 24 turns on only the transistors Tr15 and Tr18 (Step 2). This causes an exciting current to flow through the second exciting coil L12 in the direction of an arrow A2 and a magnetic field is generated on the basis of the exciting current. Subsequently, the control circuit 24 turns on only the transistors Tr12 and Tr13 (Step 3). This causes an exciting current to flow through the first exciting coil L11 in the direction of an arrow A3 and a magnetic field is generated on the basis of the exciting current. Next, the control circuit 24 turns on only the transistors Tr16 and Tr17 (Step 4). This causes an exciting current to flow through the second exciting coil L12 in the direction of an arrow A4 and a magnetic field is generated on the basis of the exciting current.

Thus, in the driving circuit 22 of the stepping motor 20, the transistors Tr11–Tr18 are turned on and off in the order of Step 1 to Step 4 on the basis of the control signals Ø11–Ø18 from the control circuit 24 and the first and the second exciting coils L11 and L12 are excited in a predetermined timing and polarity. These excitations of the first and the second exciting coils L11 and L12 cause the rotating magnetic field to be generated and the rotor 21 to be rotated.

The first prior art motor 10 described above is more advantageous than the second prior art motor 20 in that the driving circuit 12 can easily be formed with fewer transistors. However, when the motor 10 has the same dimension as the motor 20, the motor 10 requires much more exciting current than the motor 20, when both of the motors 10 and 20 provide the same outputs. Therefore, the motor 10 generates a large amount of heat and is inefficient. Conversely, although the motor 20 generates less heat and is more efficient than the motor 10, the motor 20 has a problem in that the driving circuit 22 must be formed with many transistors and is expensive.

There is a demand for a stepping motor having both features of a high efficiency and a low cost. Accordingly, the driving circuit 22 for the motor 20 (bipolar driving system) having a high efficiency should be simplified in circuit structure.

SUMMARY OF THE INVENTION

In light of the above, it is an object of the present invention to provide a driving apparatus for a stepping motor driven by a bipolar driving system and having a simplified circuit structure.

In order to achieve the above object, in accordance with a first aspect of the present invention, there is provided an apparatus for driving a stepping motor, the stepping motor having a plurality of exciting coils from a first exciting coil to a last exciting coil, each having a first terminal and a second terminal. The apparatus comprises a first and a second switching circuit connected between the first terminal of the first exciting coil and a power supply and between the first terminal and a ground, respectively. Also, the apparatus comprises a third and a fourth switching circuit connected between each of common terminal(s) and the power supply and between the each common terminal and the ground, respectively. The each common terminal connects to the second terminal of each of the plurality of exciting coils and the first terminal of the exciting coil adjacent the each exciting coil. Further, the apparatus comprises a fifth and a sixth switching circuit connected between the second terminal of the last exciting coil and the power supply and between the second terminal and the ground, respectively. The first to sixth switching circuits are controlled so that the plurality of exciting coils are supplied with exciting current in both directions.

In accordance with a second aspect of the present invention, there is provided an apparatus for driving a stepping motor, the stepping motor having a plurality of exciting coils from a first exciting coil to a last exciting coil, each having a first end and a second end, the first end of the first exciting coil being derived as a first terminal outside the motor, the second end of the last exciting coil being derived as a second terminal outside the motor, and the second end of each of the plurality of exciting coils being connected to the first end of the exciting coil adjacent the each exciting coil and being derived as a common terminal outside the motor. The apparatus comprises a first and a second switching circuit connected between the first terminal of the first exciting coil and a power supply and between the first terminal and a ground, respectively. Also, the apparatus comprises a third and a fourth switching circuit connected between each of the common terminal(s) and the power supply and between the each common terminal and the ground, respectively. Further, the apparatus comprises a fifth and a sixth switching circuit connected between the second terminal of the last exciting coil and the power supply and between the second terminal and the ground, respectively. The first to sixth switching circuits are controlled so that the plurality of exciting coils are supplied with exciting current in both directions.

In accordance with a third aspect of the present invention, there is provided an apparatus for driving a plurality of stepping motors, each of the stepping motors having a first exciting coil and a second exciting coil, each of the exciting coils having a first end and a second end, the first end of the first exciting coil being derived as a first terminal outside the motor, the second end of the second exciting coil being derived as a second terminal outside the motor, and the second end of the first exciting coil being connected to the first end of the second exciting coil and being derived as a common terminal outside the motor. The apparatus comprises a first and a second switching circuit provided for each of the plurality of stepping motors, the first and the second switching circuit connected between the first terminal of each of the stepping motors and a power supply and between the first terminal and a ground, respectively. Also, the apparatus comprises a third and a fourth switching circuit provided common to the plurality of stepping motors, the common terminals of the plurality of stepping motors being connected together, the third and the fourth switching circuit connected between one of the connected common terminals and the power supply and between the one of the connected common terminals and the ground, respectively. Further, the apparatus comprises a fifth and a sixth switching circuit provided for each of the plurality of stepping motors, the fifth and the sixth switching circuit connected between the second terminal of each of the stepping motors and the power supply and between the second terminal and the ground, respectively. The first to sixth switching circuits for each of the stepping motors are selectively turned on and off so that the first and the second exciting coils of each of the stepping motors are supplied with exciting current in both directions.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1A is a schematic view showing a stepping motor used in a first embodiment of the present invention;

FIG. 1B is a circuit diagram showing a driving circuit of the stepping motor in accordance with the first embodiment of the present invention;

FIG. 2 is a view explaining the operation of the driving circuit shown in FIGS. 1A and 1B;

FIG. 12 is a table explaining the operation of the driving circuit of FIG. 11B.

DESCRIPTION OF THE PREFERRED EMBODIMENTS (A First Embodiment)

Figure 11A:
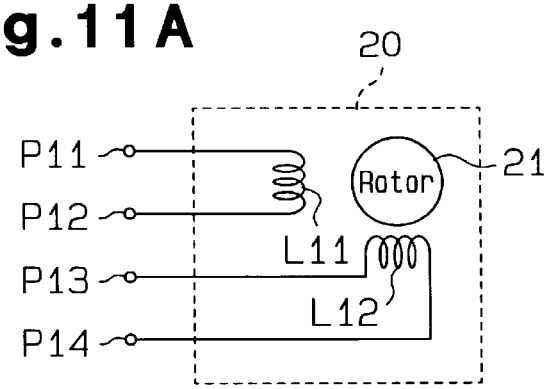
FIG. 11A is a schematic view of a stepping motor used in the second prior art.
Figure 11B:
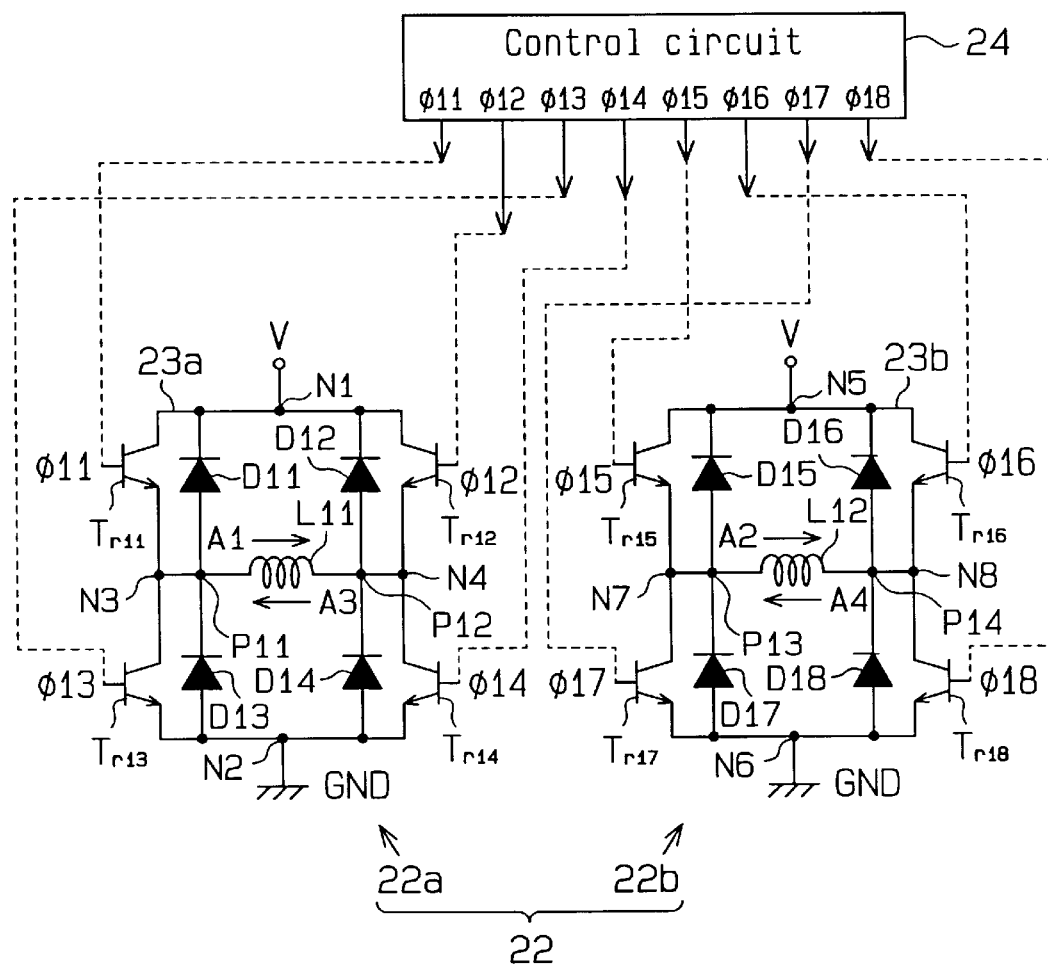
FIG. 11B is a circuit diagram of a driving circuit of the stepping motor of FIG. 11A.

A first embodiment of the present invention will now be described with reference to FIGS. 1A, 1B and 2. In this embodiment, the same symbols as in the second prior art motor 20 shown in FIGS. 11A and 11B are affixed to the same components of the present embodiment, and further explanation thereof is omitted.

As shown in FIGS. 1A and 1B, a stepping motor 30 of the present embodiment has a rotor 31 and first and second exciting coils L11 and L12 which apply a rotating magnetic field to the rotor 31. A driving circuit 32 for driving the stepping motor 30 is designed such that the second driving portion 22b shown in the second prior art has one portion of the first driving portion 22a shown in the second prior art for common use.

Specifically, the transistors Tr15, Tr17 and diodes D15, D17 in the second prior art are not included in the driving circuit 32. Also, the node N5 is connected to the node N1, and the node N6 is connected to the node N2. Further, the external terminal P13 is connected to the external terminal P12 for common use. With such a connection, a first bridge circuit 32a comprises the transistors Tr11–Tr14, and a second bridge circuit 32b comprises the transistors Tr12, Tr14, Tr16, Tr18.

Thus, The driving circuit 32 has the transistors Tr11 and Tr13 connected between the terminal P11 connecting to one end of the first exciting coil L11 and the power supply V and between the terminal P11 and the ground GND, respectively. Also, the driving circuit 32 has the transistors Tr12 and Tr14 connected between the terminal P12 (a common terminal) and the power supply V and between the terminal P12 and the ground GND, respectively. The terminal P12 is formed by connecting the other end of the first exciting coil L11 and one end of the second exciting coil L12. Further, the driving circuit 32 has the transistors Tr16 and Tr18 connected between the terminal P14 connecting to the other end of the second exciting coil L12 and the power supply V and between the terminal P14 and the ground GND, respectively.

To the bases of the transistors Tr11–Tr14, Tr16, Tr18 are input control signals Ø11–Ø14, Ø16, Ø18 from a control circuit 33, respectively, and the transistors Tr11–Tr14, Tr16, Tr18 are selectively turned on and off on the basis of the control signals Ø11–Ø14, Ø16, Ø18.

As shown in FIG. 2, the control circuit 33 first turns on only the transistors Tr11 and Tr14 (Step 1). This causes an exciting current to flow through the first exciting coil L11 in the direction of an arrow A1 and a magnetic field is generated on the basis of the exciting current. Next, the control circuit 33 turns on only the transistors Tr12 and Tr18 (Step 2). This causes an exciting current to flow through the second exciting coil L12 in the direction of an arrow A2 and a magnetic field is generated on the basis of the exciting current. Subsequently, the control circuit 33 turns on only the transistors Tr12 and Tr13 (Step 3). This causes an exciting current to flow through the first exciting coil L11 in the direction of an arrow A3 and a magnetic field is generated on the basis of the exciting current. Finally, the control circuit 33 turns on only the transistors Tr14 and Tr16 (Step 4). This causes an exciting current to flow through the second exciting coil L12 in the direction of an arrow A4 and a magnetic field is generated on the basis of the exciting current.

Thus, in the driving circuit 32 of the stepping motor 30, the transistors Tr11–Tr14, Tr16, Tr18 are turned on and off in the order of Step 1 to Step 4 on the basis of the control signals Ø11–Ø14, Ø16, Ø18 from the control circuit 33 and the first and the second exciting coils L11 and L12 are excited in a predetermined timing and polarity. Such excitations of the first and the second exciting coils L11 and L12 cause the rotating magnetic field to be generated and the rotor 31 to be rotated.

According to the present embodiment as stated above, the following effects are obtained.

(1) In the driving circuit 32 of the present embodiment, the first bridge circuit 32a comprises the transistors Tr11 –Tr14 and the second bridge circuit 32b comprises the transistors Tr12, Tr14, Tr16 and Tr18. Namely, two transistors Tr12 and Tr14 are shared by the two bridge circuits 32a and 32b, and therefore, the two bridge circuits 32a and 32b comprise the six transistors Tr11–Tr14, Tr16, Tr18. Accordingly, the driving circuit 32 is more simple than the driving circuit 22.

(2) As the two bridge circuits 32a and 32b have the two transistors Tr12 and Tr14 for common use, the external terminal P12 can be used for the external terminal P13 and the external terminal P13 can be omitted. Accordingly, since, compared to the motor 20 of the second prior art described previously, the motor 30 of the present embodiment has a lesser number of the external terminals, the number of wires connecting the motor 30 and the driving circuit 32 can be reduced. This enables the vehicle air conditioning system comprising the motor 30 and the driving circuit 32 to be less expensive, lighter, and easily assembled.

(A Second Embodiment)

A second embodiment of the present invention will now be described below with reference to FIGS. 3 to 7. In this embodiment, the same symbols as in the first embodiment are affixed to the same components of the present embodiment as those of the first embodiment, and the detailed explanations thereof are omitted.

Figure 3:
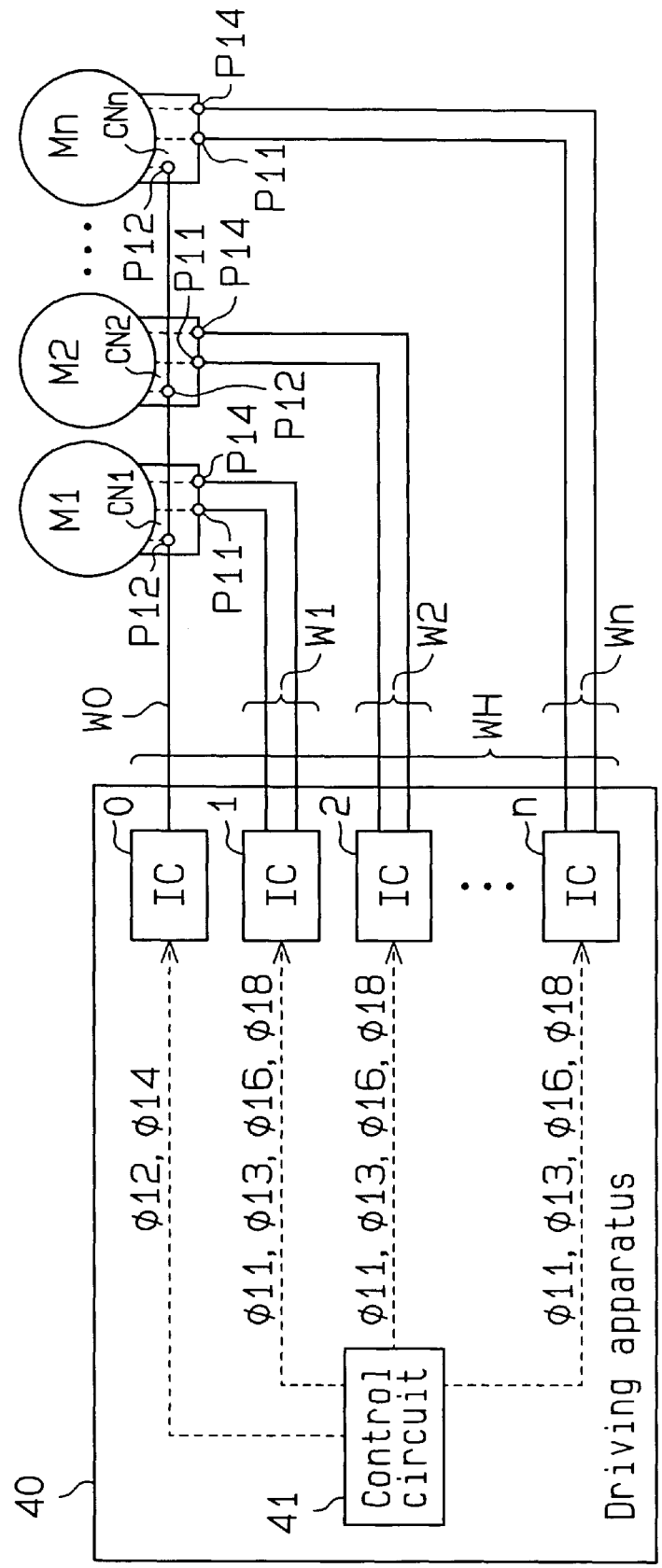
FIG. 3 is a schematic diagram of a vehicle air conditioning system explaining a driving apparatus for a stepping motor in accordance with a second embodiment of the present invention.
Figure 4:
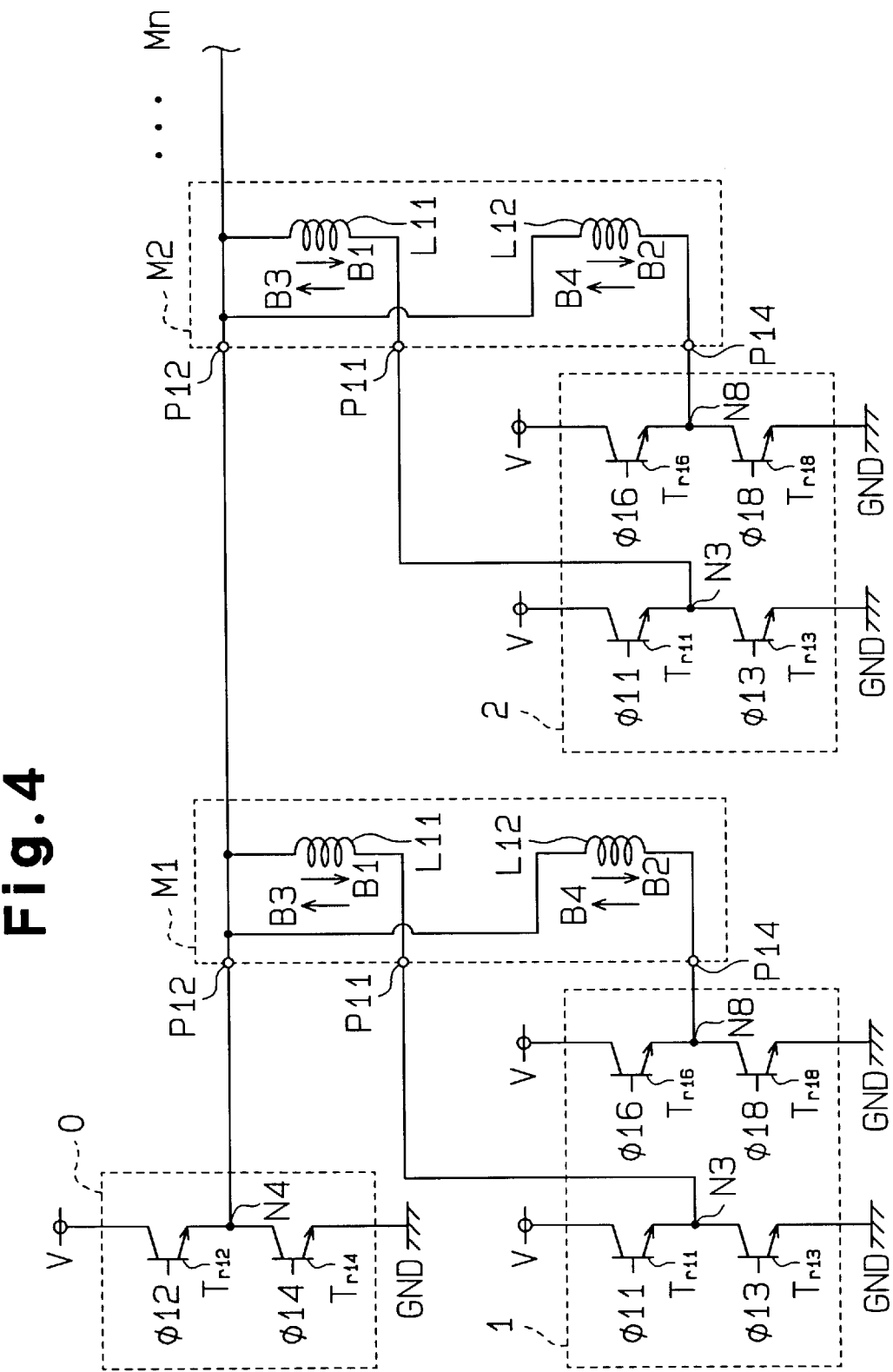
FIG. 4 is an electrical circuit diagram showing the driving apparatus for the stepping motor used in the vehicle air conditioning system.
Figure 5:
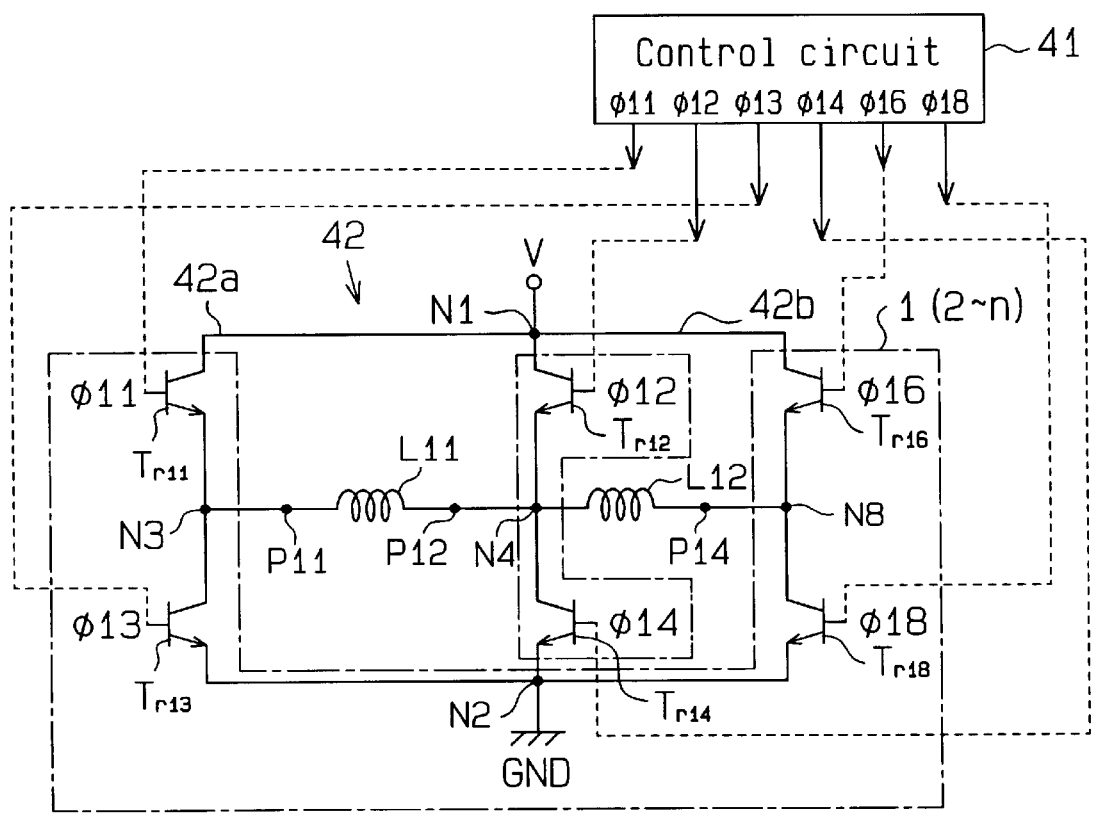
FIG. 5 is a schematic diagram showing the driving apparatus for the stepping motor used in the vehicle air conditioning system.

FIGS. 3 to 5 shows electrical circuits for driving various kinds of doors in a vehicle air conditioning system, such as a door for switching blow-out ports, a door for adjusting temperature and a door for switching between inner air and outer air. An actuator of the vehicle air conditioning system includes N stepping motors (referred to a first to a n-th motor, hereinafter) M1–Mn, each of which has exciting coils L11, L12 and external terminals P11, P12, P14. The motors M1–Mn are controlled by a driving apparatus 40. This driving apparatus 40 has an IC0 for common use, IC1–ICn for driving the first to the n-th motors, respectively, and a control circuit 41.

The IC0 for common use includes transistors Tr12 and Tr14. Each of the IC1–ICn for driving the first to the n-th motors includes transistors Tr11, Tr13, Tr16, Tr18. Since the transistors Tr12 and Tr13 included in the IC0 for common use are shared by all of the motors M1–Mn, it is desired that the current capacities thereof are larger than those of the transistors Tr11, Tr13, Tr16, Tr18 in the other IC, i.e. IC1–ICn.

The control circuit 41 provides control signals Ø12, Ø14 to bases of the transistors Tr12, Tr14 in the IC0 for common use. Also, the control circuit 41 provides control signals Ø11, Ø13, Ø16, Ø18 to bases of the transistors Tr11, Tr13, Tr16, Tr18 in each of IC1–ICn for driving the first to n-th motors.

The first motor M1 is driven by the IC0 for common use and the IC1 for driving the first motor. Specifically, as shown in FIG. 5, a driving circuit 42 (a first and a second bridge circuits 42a, 42b), similar to the driving circuit 32 in the first embodiment described previously, includes the IC0 for common use and the IC1 for driving the first motor, and drives the first motor M1. The second motor M2 is driven by the IC0 for common use and the IC2 for driving the second motor. Specifically, the driving circuit 42 (a first and a second bridge circuits 42a and 42b) includes the IC0 for common use and the IC2 for driving the second motor, and drives the second motor M2. Similarly, the n-th motor Mn is driven by the IC0 for common use and the ICn for driving the n-th motor. Specifically, the driving circuit 42 (a first and a second bridge circuits 42a and 42b) includes the IC0 for common use and the ICn for driving the n-th motor, and drives the n-th motor Mn.

Thus, the driving circuit 42 has the transistors Tr11 and Tr13 provided in each of the n stepping motors M1–Mn. The transistors Tr11 and Tr13 are connected between each of the terminals P11 in the stepping motors M1–Mn and the power supply V and between each of the terminals P11 and the ground GND, respectively. Also, the driving circuit 42 has the transistors Tr12 and Tr14 commonly used by the n stepping motors M1–Mn. The transistors Tr12 and Tr14 are connected between a terminal connecting together the terminals P12 (common terminals) of the stepping motors M1–Mn and the power supply V and between the terminal connecting together the common terminals P12 and the ground GND, respectively. Further, the driving circuit 42 has the transistors Tr16 and Tr18 provided in each of the n stepping motors M1–Mn. The transistors Tr16 and Tr18 are connected between each of the terminals P14 in the stepping motors M1–Mn and the power supply V and between each of the terminals P14 and the ground GND, respectively.

Next, the operation of each motor M1–Mn in the vehicle air conditioning system having such a structure will be explained with reference to FIGS. 6 and 7, which show the operation of the first and second motors M1 and M2.

[In the Case of Forwardly Rotating the First and the Second Motors M1, M2]

Figure 6:
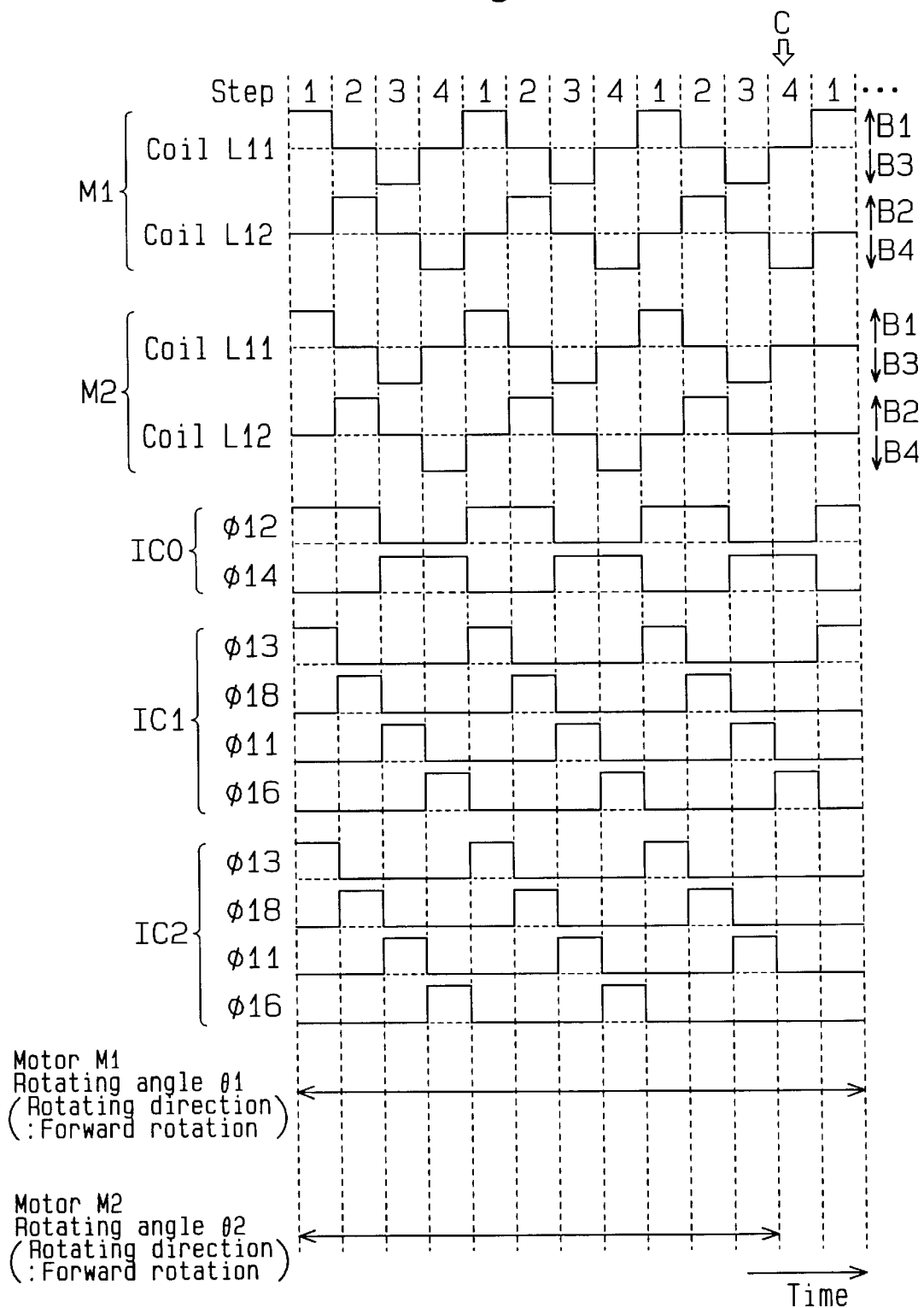
FIGS. 6 and 7 are timing diagrams explaining the operation of the driving apparatus for the stepping motor in accordance with the second embodiment of the present invention.

In the case of forwardly rotating the first and the second motors M1 and M2, the control circuit 41 provides the control signals Ø12, Ø14 as shown in FIG. 6 to the IC0 for common use, and the control signals Ø11, Ø13, Ø16, Ø18 as shown in FIG. 6 to the IC1 and the IC2 for driving the first and the second motors.

Specifically, in Step 1, the control circuit 41 provides the control signal Ø12 of H level to the IC0 for common use, and the control signal Ø13 of H level to the IC1 and the IC2 to turn on the transistor Tr12 in the IC0 and the transistors Tr13 in the IC1 and the IC2. This causes the exciting current to flow through the exciting coil L11 of each of the motors M1, M2 in the direction of an arrow B1, and the magnetic field is generated on the basis of the exciting current.

Next, in Step 2, the control circuit 41 provides the control signal Ø12 of H level to the IC0, and the control signal Ø18 of H level to the IC1 and the IC2 to turn on the transistor Tr12 in the IC0 and the transistors Tr18 in the IC1 and the IC2. This causes the exciting current to flow through the exciting coil L12 of each of the motors M1, M2 in the direction of an arrow B2, and the magnetic field is generated on the basis of the exciting current.

Next, in Step 3, the control circuit 41 provides the control signal Ø14 of H level to the IC0, and the control signal Ø11 of H level to the IC1 and the IC2 to turn on the transistor Tr14 in the IC0 and the transistors Tr11 in the IC1 and the IC2. This causes the exciting current to flow through the exciting coil L11 of each of the motors M1, M2 in the direction of an arrow B3, and the magnetic field is generated on the basis of the exciting current.

Next, in Step 4, the control circuit 41 provides the control signal Ø14 of H level to the IC0, and the control signal Ø16 of H level to the IC1 and the IC2 to turn on the transistor Tr14 in the IC0 and the transistors Tr16 in the IC1 and the IC2. This causes the exciting current to flow through the exciting coil L12 of each of the motors M1, M2 in the direction of an arrow B4, and the magnetic field is generated on the basis of the exciting current.

Thus, in the first and second motors M1, M2, the transistors Tr11–Tr14, Tr16, Tr18 are turned on and off in the order of Step 1 to Step 4 as described above on the basis of the control signals Ø11–Ø14, Ø16, Ø18 from the control circuit 41, and the exciting coils L11, L12 of each of the motors M1, M2 are excited in a predetermined timing and polarity. Such excitations of the exciting coils L11, L12 of each of the motors M1, M2 cause the rotating magnetic field to be generated in each of the motors M1, M2.

[In the Case of Forwardly Rotating the First Motor M1 and Reverse Rotating the Second Motor M2]

Figure 7:
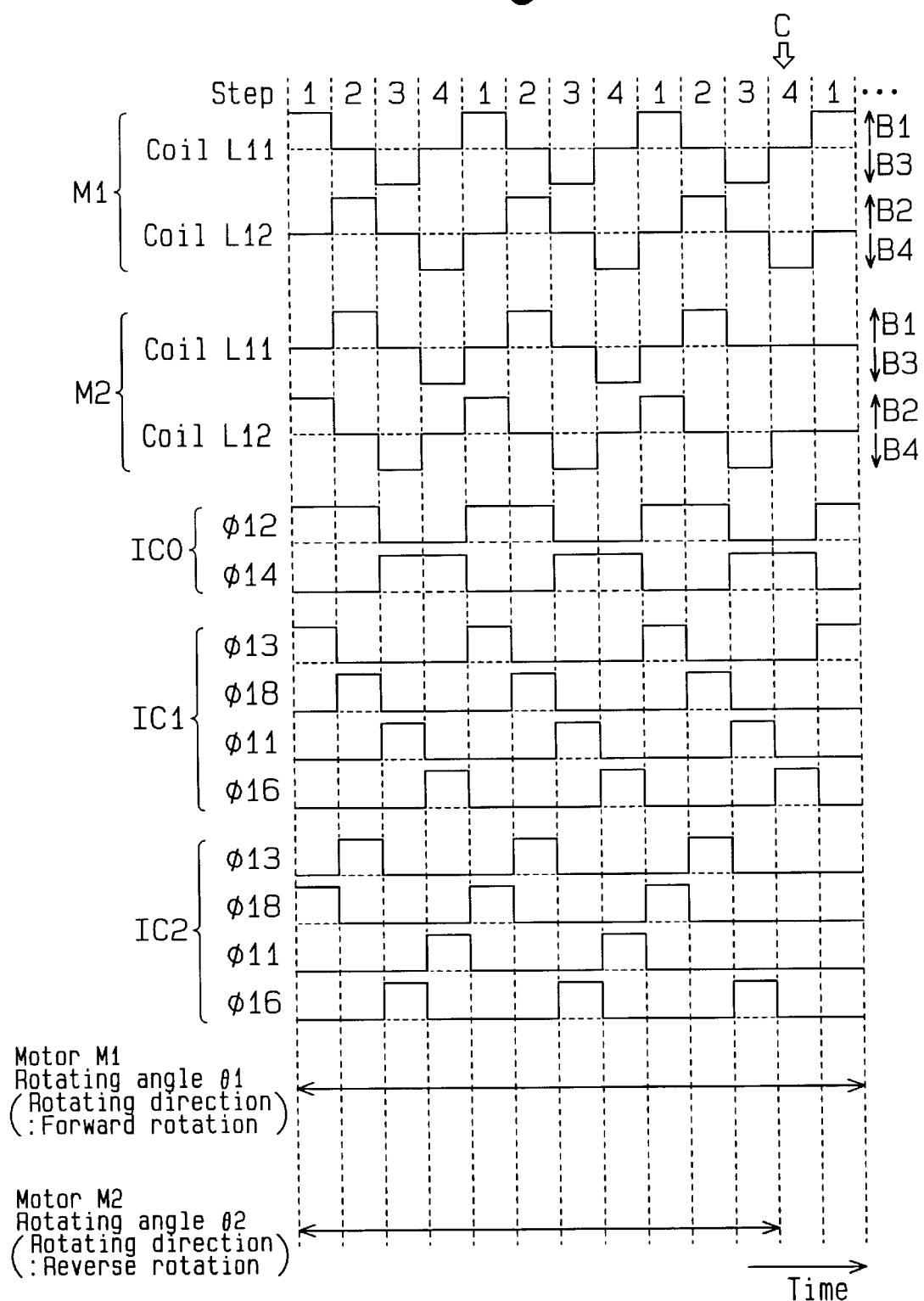

In the case of forwardly rotating the first motor M1 and reverse rotating the second motor M2, the control circuit 41 provides the control signals Ø12, Ø14 as shown in FIG. 7 to the IC0 for common use, and the control signals Ø11, Ø13, Ø16, Ø18 as shown in FIG. 7 to the IC1 and the IC2 for driving the first and the second motors.

Specifically, in Step 1, the control circuit 41 provides the control signal Ø12 of H level to the IC0, the control signal Ø13 of H level to the IC1, and the control signal Ø18 of H level to the IC2 to turn on the transistor Tr12 in the IC0, the transistor Tr13 in the IC1 and the transistor Tr18 in the IC2. This causes the exciting current to flow through the exciting coil L11 of the motor M1 in the direction of the arrow B1, and the exciting current to flow through the exciting coil L12 of the motor M2 in the direction of the arrow B2. The magnetic fields are generated on the basis of the exciting currents, respectively.

Next, in Step 2, the control circuit 41 provides the control signal Ø12 of H level to the IC0, the control signal Ø18 of H level to the IC1, and the control signal Ø13 of H level to the IC2, to turn on the transistor Tr12 in the IC0, the transistor Tr18 in the IC1 and the transistor Tr13 in the IC2. This causes the exciting current to flow through the exciting coil L12 of the motor M1 in the direction of the arrow B2, and the exciting current to flow through the exciting coil L11 of the motor M2 in the direction of the arrow B1. The magnetic fields are generated on the basis of the exciting currents, respectively.

Next, in Step 3, the control circuit 41 provides the control signal Ø14 of H level to the IC0, the control signal Ø11 of H level to the IC1 and the control signal Ø16 of H level to the IC2, to turn on the transistor Tr14 in the IC0, the transistor Tr11 in the IC1 and the transistor Tr16 in the IC2. This causes the exciting current to flow through the exciting coil L11 of the motors M1 in the direction of the arrow B3, and the exciting current to flow through the exciting coil L12 of the motor M2 in the direction of the arrow B4. The magnetic fields are generated on the basis of the exciting currents, respectively.

Next, in Step 4, the control circuit 41 provides the control signal Ø14 of H level to the IC0, the control signal Ø16 of H level to the IC1 and the control signal Ø11 of H level to the IC2, to turn on the transistor Tr14 in the IC0, the transistor Tr16 in the IC1 and the transistor Tr11 in the IC2. This causes the exciting current to flow through the exciting coil L12 of the motor M1 in the direction of the arrow B4, and the exciting current to flow through the exciting coil L11 of the motor M2 in the direction of the arrow B3. The magnetic fields are generated on the basis of the exciting currents, respectively.

As the exciting coils L11, L12 of the motors M1, M2 are excited in such manners, the rotating magnetic fields are generated in the first motor M1 to rotate forwardly and in the second motor M2 to rotate in reverse.

[In the Case of Stopping Only the Second Motor M2 During Operation]

In the steps indicated by the arrows C of FIGS. 6 and 7, when the control circuit 41 stops providing the control signals Ø11, Ø13, Ø16, Ø18 to the IC2 for driving the second motor, the exciting coils L11, L12 of the second motor M2 are de-excited and the motor M2 stops rotating. That is, it is possible to independently control the rotating angles of the first and the second motors M1, M2.

According to the present embodiment as stated above, the following effects are obtained:

(1) In the present embodiment, the transistors Tr12, Tr14 are commonly used for the motors M1–Mn. Accordingly, in the present embodiment, it is sufficient to provide four transistors for each of motors M1–Mn and to provide two transistors for all of the motors M1–Mn. That is, in the present embodiment, it is sufficient to provide (4×n+2) of transistors. If the driving circuit 32 of the above-said first embodiment (including six transistors) is used in each of the n motors M1–Mn, (6×n) of transistors are necessary in total. Thus, in the present embodiment, the number of the transistors is reduced. Accordingly, the driving apparatus 40 has a simple structure and consequently can be miniaturized, lightened and less expensive.

(2) Since the transistors Tr12 and Tr14 are commonly used for all of the motors M1–Mn, it is possible that the external terminal P11 of each of the motors M1–Mn and the driving apparatus 40 are connected by one wire, that the external terminal P14 of each of the motors M1–Mn and the driving apparatus 40 are connected by one wire, and that the external terminals P12 of the motors M1–Mn are interconnected and one of the interconnected terminals P12 and the driving apparatus 40 are connected by one wire. That is, in the present embodiment, (2×x n+1) wires are sufficient to connect the driving circuit 40 and the motors M1–Mn. If the driving circuit 32 of the above-said first embodiment is used for each of the n motors M1–Mn, (3×n) wires are necessary in total. Thus, the number of wires connecting the driving circuit 40 and the motors M1–Mn can be reduced. Accordingly, the vehicle air conditioning system can be less expensive, lightened and easy to assemble.

Figure 8:
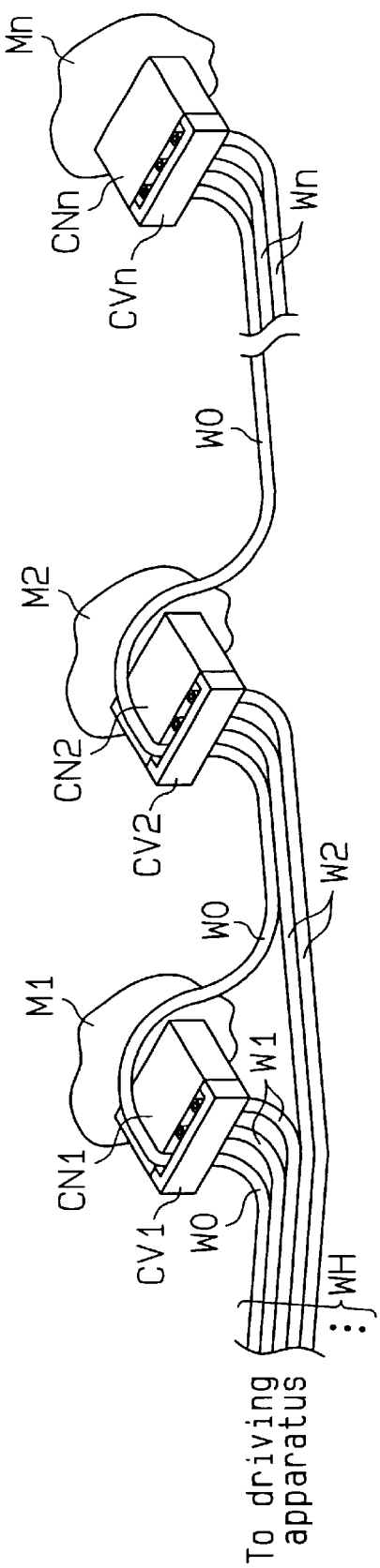
FIGS. 8, 9A and 9B are perspective views explaining a connection between the driving apparatus and each of the motors.
Figure 9A:
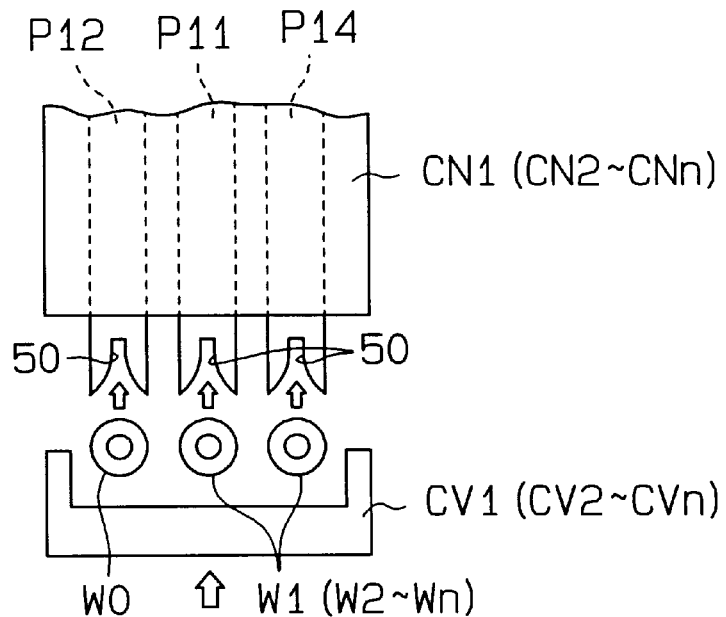
Figure 9B:
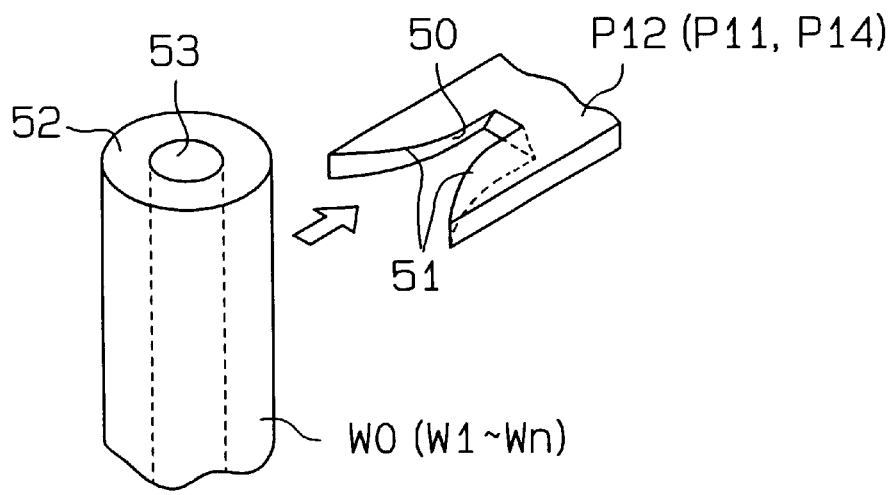
Figure 10A:
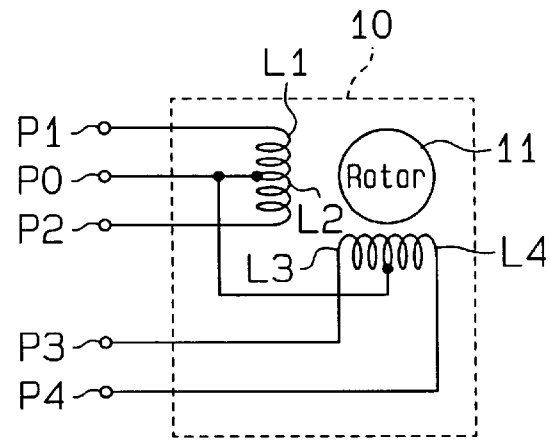
FIG. 10A is a schematic view of a stepping motor used in the first prior art.
Figure 10B:
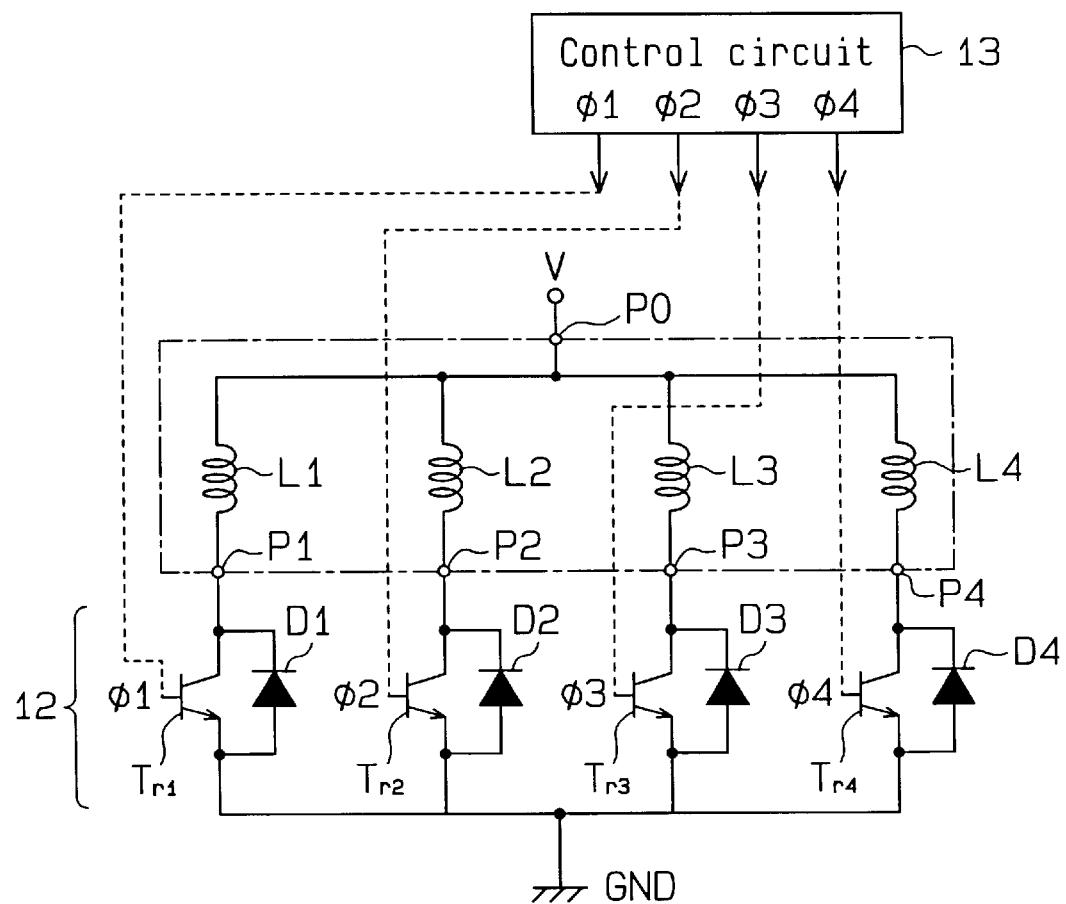
FIG. 10B is a circuit diagram of a driving circuit of the stepping motor of FIG. 10A.

In the present embodiment, the driving apparatus 40 and the motors M1–Mn are connected as shown in FIG. 8. That is, a wire harness WH having (2×n+1) of bundled wires extends from the driving apparatus 40. The wire harness WH has a wire W0 commonly used by the motors M1–Mn, and wires W1–Wn, each of which has two wires for each of the motors M1–Mn. Each of connectors CN1–CNn for the motors M1–Mn is equipped with terminals P11, P12, P14 as shown in FIGS. 9A and 9B. Each of the terminals P11, P12, P13 is formed at a tip portion thereof with a concave portion 50. Each of the concave portions 50 is narrow at the bottom side thereof and has edges at the inside surfaces thereof. The wires W0–Wn are pushed into these concave portions, respectively. Covers CV1–CVn are fitted on to the connectors CN1–CNn, respectively, to push the wires W0–Wn into the concave portions 50 and to prevent the wires W0–Wn from coming out from the concave portions 50.

Then, as shown in FIGS. 9A and 9B, the wires W0–Wn are disposed in the concave portions 50 of the terminals P11, P12, P14 and the covers CV1–CVn are fitted on the connectors CN1–CNn. At this time, the wires W0–Wn are pushed into the concave portions 50, the coatings or insulation 52 of the wires W0–Wn are cut by the edges 51 of the concave portions 50, and the cores 53 of the wires W0–Wn are brought into contact with the terminals P11, P12, P14. Thus, as shown in FIG. 3, the terminals P12 of the motors M1–Mn are connected to the IC0 by the wire W0, and the terminals P11, P14 of the motors M1–Mn are connected to the IC1–ICn by the wires W1-Wn, respectively. In this case, the IC0 and the motors M1–Mn can be connected by the single wire W0 being not cut.

(3) In the present embodiment, notwithstanding that the number of the transistors in the driving apparatus 40 is reduced, the rotating directions and the rotating angles of the respective n motors M1–Mn can be separately controlled.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

For example, the embodiments of the present invention can be modified as follows.

Although in the first embodiment the flywheel diodes D11–D14, D16, D18 are connected between the collectors and the emitters of the transistors Tr11–Tr14, Tr16, Tr18, these diodes D11–D14, D16, D18 may be omitted.

In the second embodiment, flywheel diodes can be connected between the collectors and the emitters of the transistors Tr11–Tr14, Tr16, Tr18.

Although in the second embodiment there are provided the IC1–ICn for the respective motors M1–Mn, each of which has four transistors Tr11, Tr13, Tr16, Tr18, the number of the ICs can be reduced by appropriately putting together these ICs. For example, if ICs having eight transistors are used, the number of ICs can be reduced to half. With such ICs, the driving apparatus 40 can be further miniaturized, less expensive, and easy to assemble.

Although in the second embodiment there is utilized the motors M1–Mn each having three external terminals P11, P12, P14 by common use of the external terminals P12 and P13, it is possible to use the motors 20 each having four external terminals P11–P14 as shown in FIG. 11A. In that case, wires extending from the external terminals P12 and P13 are interconnected in the driving apparatus 40. With such a constitution, although 2(n+1) of wires connecting the driving apparatus 40 and the motors M1–Mn are required, when the driving circuit 32 of the first embodiment is used for each of the n motors M1–Mn, the total number of wires is (3×n). Accordingly, even in case of using the motors 20 as shown in FIG. 11A, the number of wires connecting the driving apparatus 40 and the motors M1–Mn can be reduced.

In each of the embodiments described above, although the driving circuit 32, 42 had each of the sides of the each bridge circuit 32a, 32b, 42a, 42b provided with respective one transistor Tr11–Tr14, Tr16, Tr18, the driving circuit could be designed such that each side of the bridge circuit is provided with two or more transistors.

In each of the embodiments described above, the driving circuit 32, 42 used bipolar transistors Tr11–Tr14, Tr16, Tr18. These bipolar transistors consume large amounts of power, while having large capabilities of current drive and high switching speeds. Accordingly, field effect transistors, for example MOS transistors, can be utilized in place of bipolar transistors. In doing so, because the field effect transistors consume small amounts of power, the driving circuit can be operated with low consuming power, while having small capabilities of current drive and slightly degrading the switching speeds in comparison with use of the bipolar transistors.

In each of the embodiments described above, although the stepping motor 30, M1–Mn has two exciting coils L11, L12 (two phase), a motor having three (three phase) or more exciting coils can be used. In this case, although the number of bridge circuits corresponding to the number of the exciting coils are necessary, transistors provided in two sides of adjacent bridge circuits are commonly used, as in the above described embodiments.

Figure 1C:
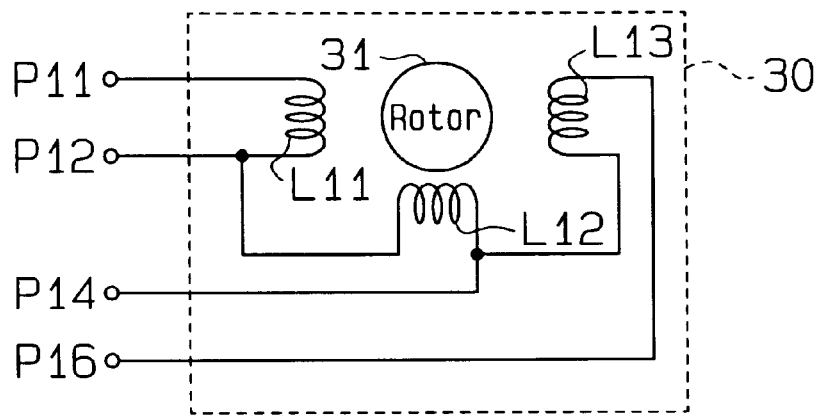
FIGS. 1C and 1D are views similar to FIGS. 1A and 1B, respectively, showing variations of the first embodiment.
Figure 1D:
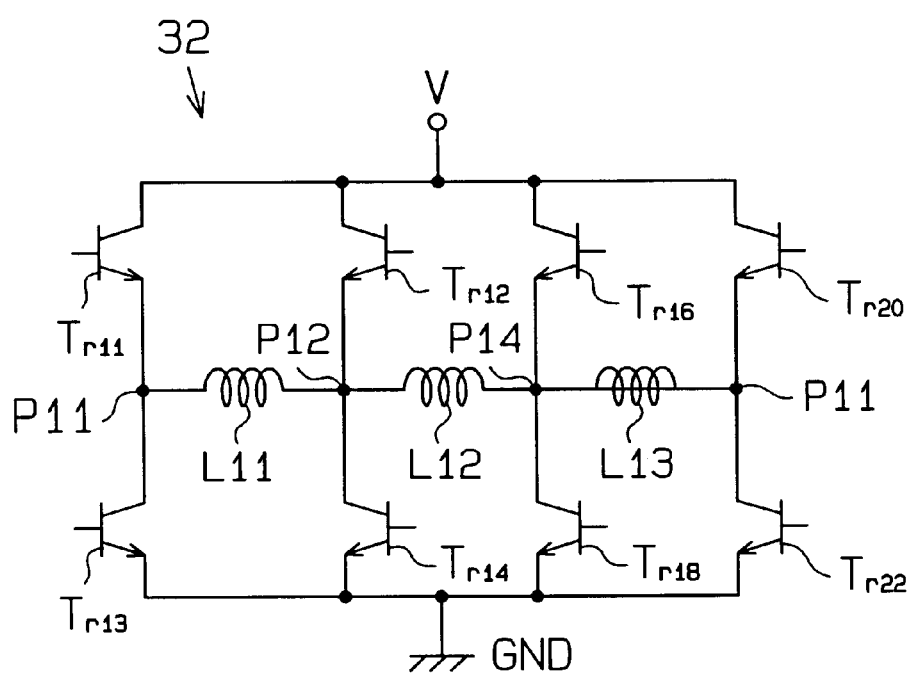

For example, suppose that the stepping motor 30 in the first embodiment has three exciting coils L11, L12, L13. As shown in FIGS. 1C and 1D, the driving circuit 32 has first and second transistors Tr11 and Tr13 connected between a first terminal P11 connecting to one end of the first exciting coil L11 and the power supply V and between the terminal P11 and the ground GND, respectively. Also, the driving circuit 32 has third and fourth transistors Tr12 and Tr14 connected between a first common terminal P12 and the power supply V and between the first common terminal P12 and the ground GND, respectively. The first common terminal P12 connects to the other end of the first exciting coil L11 and one end of the second exciting coil L12. Further, the driving circuit 32 has another third and another fourth transistors Tr16 and Tr18 connected between a second common terminal P14 and the power supply V and between the second common terminal P14 and the ground GND, respectively. The second common terminal P14 connects to the other end of the second exciting coil L12 and one end of the third exciting coil L13. Still, the driving circuit 32 has fifth and sixth transistors Tr20 and Tr22 connected between a second terminal P16 connecting to the other end of the third exciting coil L13 and the power supply V and between the second terminal P16 and the ground GND, respectively. Thus, the third and the fourth transistors Tr12 and Tr14 are commonly used by the other end of the first exciting coil L11 and the one end of the second exciting coil L12, and the another third and the another fourth transistors Tr16 and Tr18 are commonly used by the other end of the second exciting coil L12 and the one end of the third exciting coil L13.

What is claimed is:

1. An apparatus for driving a plurality of stepping motors, each of the stepping motors having a plurality of exciting coils from a first exciting coil to a last exciting coil, each having a first end and a second end, the first end of the first exciting coil having a first terminal outside the motor, the second end of the last exciting coil having a second terminal outside the motor, and the second end of each of the plurality of exciting coils being connected to the first end of the exciting coil adjacent to it and having a common terminal outside the motor, said apparatus comprising:

in each stepping motor, a first and a second switching circuit connected between the first terminal of the first exciting coil and a power supply and between the first terminal and a ground, respectively;

a third and a fourth switching circuit connected between each of the common terminal(s) and the power supply and between the each common terminal and the ground, respectively; and in each stepping motor, a fifth and a sixth switching circuit connected between the second terminal of the last exciting coil and the power supply and between the second terminal and the ground, respectively, wherein the first, the second, the fifth and the sixth switching circuits are provided to control the plurality of stepping motors, and the third and the fourth switching circuits are common to the plurality of stepping motors, and wherein the first to sixth switching circuits are controlled so that the plurality of exciting coils in each of the stepping motors are supplied with exciting current in a first direction and a second, opposite direction.

2. An apparatus as recited in claim 1, wherein each of the first to sixth switching circuits includes a single switching element.

3. An apparatus as recited in claim 2, wherein a flywheel diode is connected in parallel with each of the switching elements.

4. An apparatus as recited in claim 2, wherein each of the switching elements includes a bipolar transistor.

5. An apparatus as recited in claim 2, wherein each of the switching elements includes a field effect transistor.

6. An apparatus as recited in claim 1, further comprising a control circuit which supplies each of the first to the sixth switching circuits with a control signal and selectively turns on and off each of the switching circuits on the basis of the control signals to supply each of the exciting coils with exciting current in the first and second directions.

7. An apparatus as recited in claim 1, wherein the third and the fourth switching circuits used common to the plurality of stepping motors have current capacities larger than those of the first, the second, the fifth and the sixth switching circuits.

8. An apparatus for driving a plurality of stepping motors, each of the stepping motors having a plurality of exciting coils from a first exciting coil to a last exciting coil, each having a first terminal and a second terminal, said apparatus comprising:

in each stepping motor, a first and a second switching circuit connected between the first terminal of the first exciting coil and a power supply and between the first terminal and a ground, respectively;

a third and a fourth switching circuit connected between a respective common terminal and the power supply and between the respective common terminal and the ground, respectively, the respective common terminals being connected to the second terminal of each of the plurality of exciting coils and the first terminal of the adjacent exciting coil; and in each stepping motor, a fifth and a sixth switching circuit connected between the second terminal of the last exciting coil and the power supply and between the second terminal and the ground, respectively, wherein the first, the second, the fifth and the sixth switching circuits are provided to control the plurality of stepping motors, and the third and the fourth switching circuits are common to the plurality of stepping motors, and wherein the first to sixth switching circuits are controlled so that the plurality of exciting coils in each of the stepping motors are supplied with exciting current in a first direction and a second, opposite direction.

9. An apparatus as recited in claim 8, wherein each of the first to sixth switching circuits includes a single switching element.

10. An apparatus as recited in claim 8, further comprising a control circuit which supplies each of the first to the sixth switching circuits with control signals and selectively turns on and off each of the switching circuits on the basis of the control signals to supply each of the exciting coils with exciting current in the first and second directions.

11. An apparatus as recited in claim 8, wherein the third and the fourth switching circuits used common to the plurality of stepping motors have current capacities larger than those of the first, the second, the fifth and the sixth switching circuits.

12. An apparatus for driving a plurality of stepping motors, each of the stepping motors having a first exciting coil and a second exciting coil, each of the exciting coils having a first end and a second end, the first end of the first exciting coil having a first terminal outside the motor, the second end of the second exciting coil having a second terminal outside the motor, and the second end of the first exciting coil being connected to the first end of the second exciting coil and having a common terminal outside the motor, said apparatus comprising:

a first and a second switching circuit provided for each of the plurality of stepping motors, the first and the second switching circuits connected between the first terminal of each of the stepping motors and a power supply and between the first terminal and a ground, respectively;

a third and a fourth switching circuit provided common to the plurality of stepping motors, the common terminals of the plurality of stepping motors being connected together, the third and the fourth switching circuits connected between one of the connected common terminals and the power supply and between the one of the connected common terminals and the ground, respectively; and a fifth and a sixth switching circuit provided for each of the plurality of stepping motors, the fifth and the sixth switching circuits connected between the second terminal of each of the stepping motors and the power supply and between the second terminal and the ground, respectively, wherein the first to sixth switching circuits for each of the stepping motors are selectively turned on and off so that the first and the second exciting coils of each of the stepping motors are supplied with exciting current in a first direction and a second, opposite direction.

13. An apparatus as recited in claim 12, wherein the third and the fourth switching circuits used common to the plurality of stepping motors have current capacities larger than those of the first, the second, the fifth and the sixth switching circuits.

14. An apparatus as recited in claim 12, wherein each of the first to sixth switching circuits includes a single switching element.

15. An apparatus as recited in claim 14, wherein a flywheel diode is connected in parallel with each of the switching elements.

16. An apparatus as recited in claim 14, wherein each of the switching elements includes a bipolar transistor.

17. An apparatus as recited in claim 14, wherein each of the switching elements includes a field effect transistor.

18. An apparatus as recited in claim 12, further comprising a control circuit which supplies the first to the sixth switching circuits for each of the stepping motors with control signals and selectively turns on and off each of the switching circuits on the basis of the control signals to supply the first and the second exciting coils of each of the stepping motors with exciting current in the first and second directions.

* * * * *

UNITED STATES PATENT AND TRADEMARK OFFICE
CERTIFICATE OF CORRECTION

PATENT NO. : 6,246,205 B1
DATED : June 12, 2001
INVENTOR(S) : Yukinobu Kujira et al.

It is certified that error appears in the above-identified patent and that said Letters Patent is hereby corrected as shown below:

<u>Title page,</u>
Item [30], Foreign Application Priority Data,
"Oct. 6" should be -- Jun. 10 --
"Dec. 5, 1998" should be -- May 12, 1999 --

Signed and Sealed this

Twenty-fourth Day of September, 2002

Attest:

Attesting Officer

JAMES E. ROGAN
Director of the United States Patent and Trademark Office